United States Patent [19]
Takahashi et al.

[11] Patent Number: 5,100,568
[45] Date of Patent: Mar. 31, 1992

[54] HEAT-DISSIPATING GREASE COMPOSITION

[75] Inventors: Takayuki Takahashi, Gunma; Satoshi Kuwata, Annaka, both of Japan

[73] Assignee: Shin-Etsu Chemical Co., Ltd., Japan

[21] Appl. No.: 615,678

[22] Filed: Nov. 19, 1990

[30] Foreign Application Priority Data

Nov. 20, 1989 [JP] Japan .................. 1-302333

[51] Int. Cl.$^5$ ......................... C10M 107/50
[52] U.S. Cl. ......................... 252/28; 252/25
[58] Field of Search ..................... 252/25, 28

[56] References Cited

U.S. PATENT DOCUMENTS

| | | | |
|---|---|---|---|
| 2,676,182 | 4/1954 | Daudt et al. | 252/49.6 |
| 2,814,601 | 11/1957 | Currie et al. | 556/451 |
| 2,857,356 | 10/1958 | Goodwin | 428/268 |
| 3,671,429 | 6/1972 | Wright | 252/25 |
| 3,885,984 | 5/1975 | Wright | 106/287.14 |

FOREIGN PATENT DOCUMENTS

| | | |
|---|---|---|
| 61-195129 | 8/1986 | Japan . |
| 62-43492 | 2/1987 | Japan . |
| 62-43493 | 2/1987 | Japan . |
| 63-307513 | 5/1988 | Japan . |
| 63-256628 | 10/1988 | Japan . |

*Primary Examiner*—Prince Willis, Jr.
*Assistant Examiner*—Ellen M. McAvoy
*Attorney, Agent, or Firm*—Lowe, Price, LeBlanc & Becker

[57] ABSTRACT

A heat-dissipating grease composition which comprises 100 parts by weight of an organopolysiloxane and 100 to 900 parts by weight of an inorganic powder having high thermal conductivity and dispersed in the organopolysiloxane. The organopolysiloxane consists essentially of (1) 100 parts by weight of an organopolysiloxane having a viscosity of 50 to 500,000 centistokes at 25° C. and (2) 1 to 300 parts by weight of an organopolysiloxane which consists essentially of $R^1_3SiO_{\frac{1}{2}}$ units and $SiO_2$ units, wherein each $R^1$ is a group selected from an alkyl group, an alkenyl group and an aryl group. The molar ratio between the $R^1_3SiO_{\frac{1}{2}}$ units and the $SiO_2$ units is in the range of 0.5:1 to 2:1.

7 Claims, No Drawings

HEAT-DISSIPATING GREASE COMPOSITION

BACKGROUND OF THE INVENTION

1. Field of the Invention

This invention relates to a grease composition and more particularly, to a heat-dissipating grease composition which is adapted for a long term use.

2. Description of the Prior Art

Heat-dissipating grease compositions are known including those compositions wherein there are used, as a base oil, dimethylpolysiloxane, dimethyldiphenylpolysiloxane, dimethyldecylmethylpolysiloxane and the like, to which thickening agents such as zinc oxide, alumina, aluminum nitride, boron nitride, carbon nitride and the like are added. These known compositions are described, for example, in, U.S. Pat. No. 3,885,984, Japanese Patent Publication No. 52-33272, Japanese Kokai Nos. 62-43492 and 62-43493 and Japanese Patent Application No. 63-307513.

These heat-dissipating greases are, however, disadvantageous in that the base oils have a great tendency toward creepage especially when the greases are used over a long term. This results in oozing out of the base oil around peripheral portions to which the grease has been applied. This may lead, for example, to oil contamination and particularly, contamination of nearby electric contacts or a portion between a commutator and a brush of a micromotor therewith, with the possibility of causing contact troubles and a failure in rotation of the micromotor. In addition, the creepage of the base oil gradually degrades the heat-dissipating characteristic.

SUMMARY OF THE INVENTION

It is accordingly an object of the invention to provide a heat-dissipating grease composition which stably exhibits thermal conductivity over a long term.

It is another object of the invention to provide a heat-dissipating grease composition wherein a base oil is imparted with tackiness so that the creeping properties of the base oil can be suppressed.

It is a further object of the invention to provide a reliable heat-dissipating grease composition wherein when the grease composition is used over a long term, any oil contamination at peripheral portions at which the grease is applied does not take place, or contact troubles of electric or electronic parts or devices to which the grease is applied do not occur.

The above objects can be achieved, according to the invention, by a heat-dissipating grease composition which comprises 100 parts by weight of an organopolysiloxane and 100 to 900 parts by weight of an inorganic powder having high thermal conductivity and serving as a thickening agent. The organopolysiloxane consists essentially of (1) 100 parts by weight of an organopolysiloxane having a viscosity of 50 to 500,000 centistokes at 25° C. and (2) 1 to 300 parts by weight of an organopolysiloxane which consists essentially of $R^1_3SiO_{\frac{1}{2}}$ units and $SiO_2$ units, wherein each $R^1$ is a group selected from an alkyl group, an alkenyl group and an aryl group, a molar ratio between $R^1_3SiO_{\frac{1}{2}}$ units and $SiO_2$ units being in the range of 0.5:1 to 2:1. The ingredient (2) may further contain up to 10 mole % of $R^2_2SiO$ units, wherein each $R^2$ is a group selected from an alkyl group, an alkenyl group and an aryl group, based on the total of all the siloxane units in the ingredient (2). The thickening agent is an inorganic powder and is preferably at least one member selected from zinc oxide, alumina, aluminum nitride, boron nitride and silicon carbide.

DETAILED DESCRIPTION AND EMBODIMENTS OF THE INVENTION

The organopolysiloxane (1) is one which has the following general average unit formula

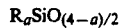

$$R_aSiO_{(4-a)/2}$$

wherein $1.95 < a < 2.20$ and each R is a group having from 1 to 18 carbon atoms and selected from saturated or unsaturated monovalent hydrocarbon groups.

Specific examples of the monovalent hydrocarbon represented by R include saturated hydrocarbon groups such as a methyl group, an ethyl group, a propyl group, a hexyl group, an octyl group, a decyl group, a dodecyl group, a tetradecyl group and the like, and unsaturated hydrocarbon groups such as a vinyl group, a phenyl group, a chlorophenyl group and the like. Of these, a methyl group, a phenyl group and an alkyl group having from 6 to 14 carbon atoms are preferred. When the above-defined organopolysiloxane has a viscosity at 25° C. of less than 50 centistokes, it may be difficult to sufficiently suppress creepage of the organopolysiloxane from the resultant heat-dissipating grease composition to which the ingredient (2) has been added. On the contrary, when the viscosity exceeds 500,000 centistokes, the content of the thickening agent has to be reduced in order to impart an appropriate degree of extensibility to the grease composition. As a result, satisfactory heat-dissipating properties cannot be obtained. Preferably, the viscosity of the polysiloxane is in the range of from 100 to 200,000 centistokes.

The organopolysiloxane of the ingredient (2) is essential for imparting an appropriate degree of tackiness to the intended grease composition. The organopolysiloxane consists essentially of $R^1_3SiO_{\frac{1}{2}}$ units and $SiO_2$ units, wherein each $R^1$ is a group selected from an alkyl group, an alkenyl group and an aryl group. The alkyl group has from 1 to 14 carbon atoms and includes, for example, a methyl group, an ethyl group, a propyl group, a hexyl group, an octyl group, a decyl group, a dodecyl group, a tetradecyl group and the like. A substituted alkyl group may also be used including a chloromethyl group, a chloropropyl group and a trifluoropropyl group and the like. The alkenyl group has from 2 to 4 carbon atoms and include, for example, a vinyl group, an allyl group, a butenyl group and the like. Examples of the aryl group include, for example, a phenyl group, a chlorophenyl group and the like. It is preferred that not less than 90% of $R^1$s is a methyl group. More preferably, each $R^1$ is a methyl group.

The molar ratio between $R^1_3SiO_{\frac{1}{2}}$ units and $SiO_2$ units is in the range of 0.5:1 to 2:1. If the ratio of the $R^1_3SiO_{\frac{1}{2}}$ units is smaller, the compatibility with the ingredient (1) becomes poor. On the other hand, a larger ratio is not favorable because satisfactory tackiness cannot be obtained. The impartment of an appropriate degree of tackiness to the composition can reduce the creepage of the organopolysiloxane (1) from the grease composition.

The $R^2_2SiO$ units may be further contained in the ingredient (2). These units are used to improve the solubility of the ingredient (2) in the ingredient (1).

The content of $R^2_2SiO$ units is in the range of up to 10 mole % of the total of all the siloxane units in ingredient (2). Each $R^2$ in the above units is a group selected from those defined with respect to $R^1$. In this case, it is also preferred that not less than 90% of $R^2$ is a methyl group. More preferably, each $R^2$ is a methyl group.

The amount of the organopolysiloxane of the ingredient (2) is in the range of from 1 to 300 parts by weight, preferably from 10 to 250 parts by weight, per 100 parts by weight of the ingredient (1). If the amount is less than 1 part by weight, the grease composition is not imparted with satisfactory tackiness. Over 300 parts by weight, the grease becomes so hard that it cannot stand use. The organopolysiloxane (2) can be prepared by hydrolysis and condensation of a corresponding silane mixture by known techniques disclosed such as, for example, in Japanese Kokai Nos. 61-195129 and 63-256628 and U.S. Pat. Nos. 2,676,182, 2,814,601 and 2,857,356.

The inorganic powder used as a thickening agent in the present invention should have good thermal conductivity and is at least one member selected from zinc oxide, alumina, aluminum nitride, boron nitride and carbon nitride. The powder should preferably have a size of from 0.1 to 50 micrometers.

In the practice of the invention, various additives may be added, if necessary. Examples of such additives include various organic or inorganic antioxidants, rust preventives, coloring pigments, dyes and the like.

The heat-dissipating grease composition of the invention may be readily obtained by weighing an organopolysiloxane mixture comprised of the ingredients (1) and (2) and the thickening agent in a mixer such as a planetary mixer and mixing them while heating, if necessary. After completion of the mixing, kneading operations are usually effected for uniform dispersion of the ingredients.

The kneading apparatus may be a three-roll mill, a colloid mill, a sand grinder, the Gaulin homogenizer and the like, of which the three-roll mill is preferred.

In the heat-dissipating grease composition of the invention, the creeping properties of the base oil are suppressed, so that when it is employed after application between a heat dissipator and a heat-dissipating plate, it exhibits stable thermal conductivity over a long term. Thus, the reliability of the instrument can be remarkably improved. When the grease is applied to electric or electronic parts or devices, oil contamination around the parts of devices or contact troubles or other troubles as would occur in micromotors can be avoided. Accordingly, the grease composition of the invention is most suitable as a heat-dissipating grease for transistors, IC, diodes, thermisters and the like which are used not only in domestic articles and audio units, but also in various industrial instruments.

The present invention is more particularly described by way of examples, which should not be construed as limiting the invention.

EXAMPLES 1 TO 7

The first organopolysiloxane ingredients consisting of ingredients (1) and (2) indicated in Table 1 were prepared, respectively.

TABLE 1

| No. | Organopolysiloxane of Ingredient (1) | | | Organopolysiloxane of Ingredient (2) | | | Viscosity of Polysiloxane cs. at 25° C. |
|---|---|---|---|---|---|---|---|
| | Kind | Viscosity cs. at 25° C. | Parts by Wt. | $(CH_3)_3SiO_{\frac{1}{2}}/SiO_2$ | Content of $(CH_3)_2SiO$ | Parts by Wt. | |
| 1 | dimethyldiphenyl-polysiloxane (phenyl group: 5 mole %) | 3,000 | 64 | 0.7 | 0 | 36 | 12,000 |
| 2 | dimethyldiphenyl-polysiloxane (phenyl group: 5 mole %) | 30,000 | 70 | 0.7 | 0 | 30 | 135,000 |
| 3 | dimethyldiphenyl-polysiloxane (phenyl group: 5 mole %) | 1,000 | 50 | 0.65 | 0 | 50 | 58,000 |
| 4 | dimethylpoly-siloxane | 500 | 45 | 0.56 | 10 | 55 | 8,500 |
| 5 | dimethylpoly-siloxane | 5,000 | 58 | 0.7 | 0 | 42 | 120,000 |
| 6 | dimethylpoly-siloxane | 200,000 | 30 | 2 | 0 | 70 | 3,000 |
| 7 | dimethylpoly-siloxane | 100 | 30 | 1 | 0 | 70 | 6,000 |

Each organopolysiloxane was used as a base oil and weighed along with thickening agents in a planetary mixer in amounts indicated in Table 2. After sufficient mixing, the mixture was kneaded in a three-roll mill three times to obtain heat-dissipating greases.

The thus obtained greases were subjected to measurement by a method as prescribed in JIS-K-2220 "Grease", with the results of immiscible consistency and oil separation shown in Table 2.

Each grease was very thinly applied onto one end of an aluminum sheet (50 mm × 150 mm × 0.1 mm), after which it was allowed to stand for 50 days at room temperature. The creepage of each grease was measured by XPS (X-ray photoelectron spectroscopy using Model ESCA 5400 photoelectron Spectroscope available from ULVAC-PHI Inc.). The thermal conductivity was measured by a heat ray method prescribed in JIS-R-2618 by the use of a TCW-1000 thermal conductivity measuring apparatus, made by Shinku Riko K. K.

TABLE 2

| Ex. No. | Base Oil In Table 1 | | Thickening Agent | | Immiscible Consistency | Oil Separation (%) 200° C./24 Hours | Creeping Property (mm) after 50 days | Thermal Conductivity cal/cm. sec. °C. |
|---|---|---|---|---|---|---|---|---|
| | No. in Table 1 | Parts by Weight | Kind | Parts by Weight | | | | |
| 1 | 1 | 25 | ZnO | 75 | 356 | 0 | 1 | $1.92 \times 10^{-3}$ |
| 2 | 2 | 30 | AlN | 70 | 348 | 0 | 0.5 | $2.30 \times 10^{-3}$ |

TABLE 2-continued

| Ex. No. | Base Oil In Table 1 No. in Table 1 | Base Oil In Table 1 Parts by Weight | Thickening Agent Kind | Thickening Agent Parts by Weight | Immiscible Consistency | Oil Separation (%) 200° C./24 Hours | Creeping Property (mm) after 50 days | Thermal Conductivity cal/cm. sec. °C. |
| --- | --- | --- | --- | --- | --- | --- | --- | --- |
| 3 | 3 | 20 | ZnO | 80 | 237 | 0 | 0.5 | $2.30 \times 10^{-3}$ |
| 4 | 4 | 30 | $Al_2O_3$ | 70 | 358 | 0.1 | 2.5 | $1.95 \times 10^{-3}$ |
| 5 | 5 | 30 | SiC | 70 | 370 | 0 | 0.3 | $1.96 \times 10^{-3}$ |
| 6 | 6 | 20 | ZnO | 80 | 345 | 0 | 3.3 | $2.00 \times 10^{-3}$ |
| 7 | 7 | 40 | BN | 60 | 320 | 0.2 | 3.0 | $1.70 \times 10^{-3}$ |

COMPARATIVE EXAMPLES 1 TO 3

The general procedure of the foregoing examples was repeated except that oils and thickening agents were used in amounts as indicated in Table 3. The results are also shown in Table 3.

The results of Tables 2 and 3 reveal that the grease compositions of the invention suffer little oil separation with a very small degree of creepage and good thermal conductivity.

TABLE 3

| Comparative Example No. | Base Oil Kind | Base Oil Parts by Weight | Thickening Agent Kind | Thickening Agent Parts by Weight | Immiscible Consistency | Oil Separation (%) 200° C./ 24 Hours | Creeping Property (mm) after 50 days | Thermal Conductivity cal/cm. sec. °C. |
| --- | --- | --- | --- | --- | --- | --- | --- | --- |
| 1 | dimethylpolysiloxane (500 cs) | 25 | ZnO | 75 | 320 | 0.5 | 115 | $1.85 \times 10^{-3}$ |
| 2 | dimethylpolysiloxane (100,000 cs) | 30 | $Al_2O_3$ | 70 | 345 | 1.50 | 35 | $1.90 \times 10^{-3}$ |
| 3 | dimethyldiphenyl-polysiloxane (500 cs) phenyl group: 25 mole % | 50 | BN | 50 | 300 | 2.50 | 90 | $1.80 \times 10^{-3}$ |

What is claimed is:

1. A heat-dissipating grease composition which comprises 100 parts by weight of an organopolysiloxane and 100 to 900 parts by weight of an inorganic powder having good thermal conductivity and dispersed in the organopolysiloxane, said organopolysiloxane consisting essentially of (1) 100 parts by weight of an organopolysiloxane having a viscosity of 50 to 500,000 centistokes at 25° C. and having the following average unit formula, $R_aSiO_{(r-a)/2}$, wherein $1.95 < a < 2.20$ and each R is a group having from 1 to 18 carbon atoms and selected from saturated or unsaturated monovalent hydrocarbon groups and (2) 1 to 300 parts by weight of an organopolysiloxane which consists essentially of $R^1{}_3SiO_{\frac{1}{2}}$ units and $SiO_2$ units, wherein each $R^1$ is a group selected from an alkyl group, an alkenyl group and an aryl group, a molar ratio between $R^1{}_3SiO_{\frac{1}{2}}$ units and the $SiO_2$ units being in the range of 0.5:1 to 2:1.

2. The grease composition according to claim 1, wherein the viscosity is in the range of from 100 to 200,000 centistokes.

3. The grease composition according to claim 1, wherein the organopolysiloxane of (2) is used in an amount of from 10 to 250 parts by weight per 100 parts by weight of the organopolysiloxane of (1).

4. The grease composition according to claim 1, wherein said inorganic powder is at least one member selected from the group consisting of zinc oxide, alumina, aluminum nitride, boron nitride and carbon nitride.

5. The grease composition according to claim 1, wherein the organopolysiloxane of (2) further comprises up to 10 mole % of $R^2{}_2SiO$ units, wherein each $R^2$ is a group selected from an alkyl group, an alkenyl group and an aryl group, based on the total of the siloxanes in the organopolysiloxane of (2).

6. The grease composition according to claim 5, wherein each $R^2$ is a methyl group.

7. The grease composition according to claim 1, wherein each $R^1$ is a methyl group.

* * * * *